United States Patent [19]

Patterson et al.

[11] 3,852,092

[45] Dec. 3, 1974

[54] THERMALLY RESPONSIVE ELASTIC MEMBRANE

[76] Inventors: James A. Patterson; Eugene D. Finkle, both of P.O.Box 304, Menlo Park, Calif. 94025

[22] Filed: June 5, 1972

[21] Appl. No.: 259,429

[52] U.S. Cl............. 117/36.7, 96/90 PC, 117/33.3, 117/100 C
[51] Int. Cl............................................. B41m 5/26
[58] Field of Search............. 117/36.8, 36.7, 100 C; 96/90 PC; 252/316; 95/12

[56] References Cited
UNITED STATES PATENTS

| | | | |
|---|---|---|---|
| 2,655,453 | 10/1953 | Sandberg | 117/36.1 |
| 3,014,301 | 12/1961 | Grupe | 117/36.7 |
| 3,192,064 | 6/1965 | Cerych et al. | 117/100 C |
| 3,336,155 | 8/1967 | Rowe | 252/316 |
| 3,516,941 | 6/1970 | Matson | 252/316 |
| 3,600,060 | 8/1971 | Churchill | 252/316 |
| 3,617,334 | 11/1971 | Brockett | 117/36.8 |
| 3,625,736 | 12/1971 | Matsukawa et al. | 117/36.2 |
| 3,720,623 | 3/1973 | Cartmell | 252/316 |
| 3,732,119 | 5/1973 | Churchill et al. | 96/90 PC |

*Primary Examiner*—William D. Martin
*Assistant Examiner*—Bernard D. Pianalto
*Attorney, Agent, or Firm*—C. Michael Zimmerman, Esq.

[57] ABSTRACT

A thin sheet or membrane of an elastic material, such as natural rubber latex, is described which has incorporated therein encapsulated particles of cholesteric material which exhibit anisotropic optical properties. The membrane also includes in intimate mixture with the cholesteric particles, particles of a material which is incompressible relative to such cholesteric particles. The incompressible particles are larger in size than the cholesteric particles so as to protect the latter from internal compressive stresses caused within the elastic membrane by flexing or stretching thereof. In one described embodiment, each encapsulated particle of cholesteric material includes a central core of a light absorptive material which improves the light scattering properties of the cholesteric material and enables the sizing of the particles to be more closely controlled.

6 Claims, 6 Drawing Figures

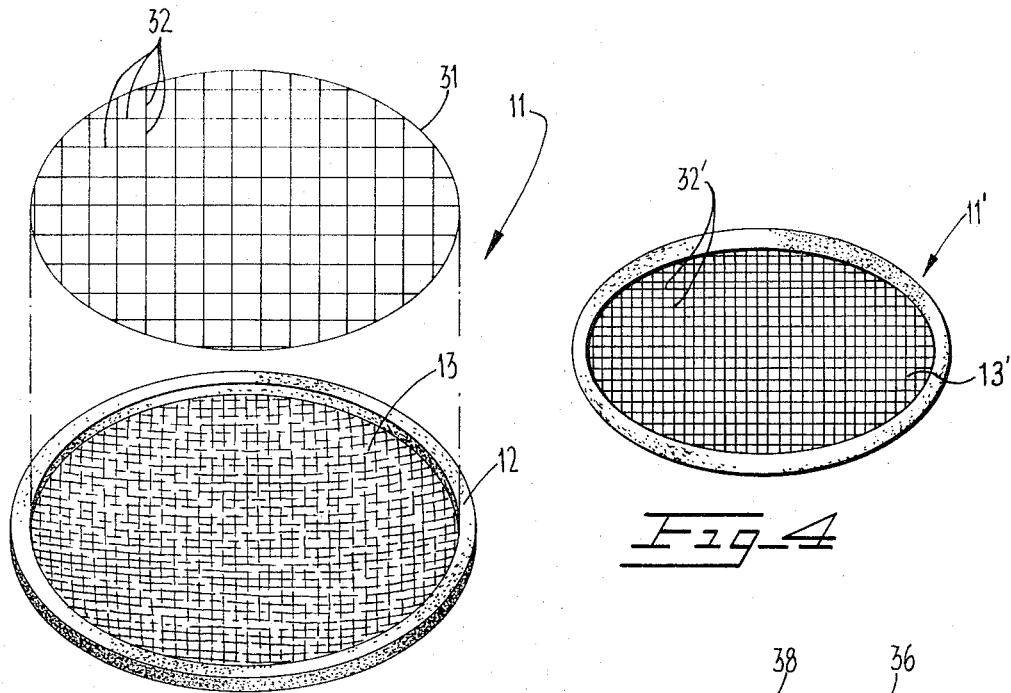
Fig_1  Fig_4
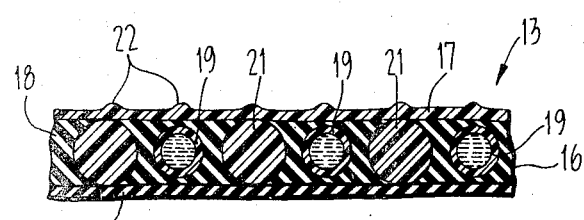
Fig_2
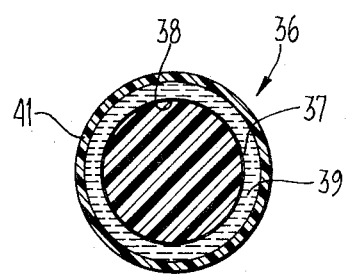
Fig_5
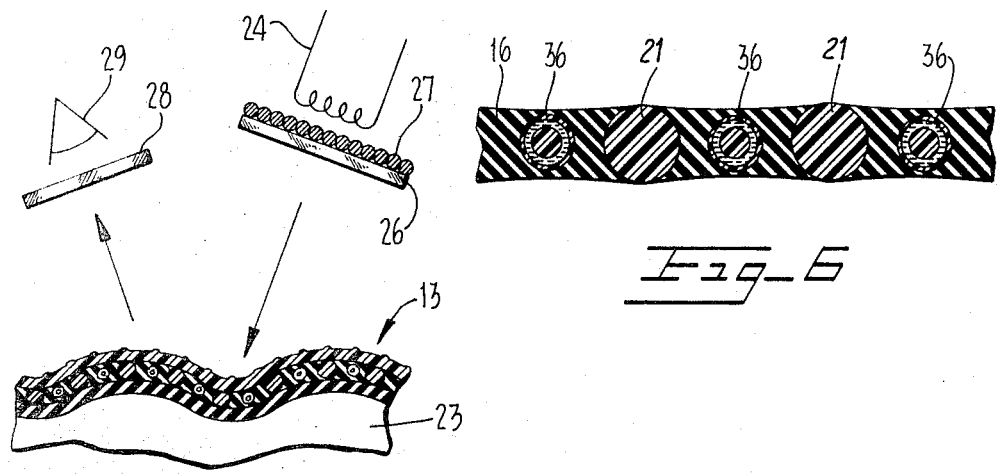
Fig_3  Fig_6

THERMALLY RESPONSIVE ELASTIC MEMBRANE

BACKGROUND OF THE INVENTION

The present invention relates generally to thermography and, more particularly, to a sheet or membrane of an elastic material which has an anisotropic material incorporated therein for indicating the temperature profile of a surface.

Cholesteric liquid crystalline materials, i.e., those organic compounds which pass through a phase between the liquid and solid phases during thermal transition, the so-called mesomorphic phase, in which they exhibit the anisotropic optical properties of crystalline solids, have been extensively studied. When in the mesomorphic phase, these materials exhibit vivid colors by differential surface reflection or scattering of chromatic light. The frequency of the scattered light is dependent primarily upon the temperature of the material. Some cholesteric materials and mixtures thereof are so temperature dependent that a marked change in color is exhibited with a temperature change as small as 0.1° C.

While various applications for such materials have been proposed in view of their unique properties, few of such applications have materialized. One of the major reasons for this is that there are many factors or variables, in addition to temperature, which can affect the frequency or color of light scattered by a cholesteric material. For example, the frequency of the scattered light is also dependent upon the frequency make-up of the light impinging on the cholesteric material, as well as on slight changes in the pressure applied to the cholesteric material.

One proposed use of cholesteric material which has generated interest is that of determining the temperature profile of a selected area of a human body. U.S. Pat. No. 3,533,339 entitled TEMPERATURES SENSING MEANS AND METHODS discloses a method of utilizing cholesteric material for this purpose which is fairly representative of the state of the art in this regard. As disclosed therein, the approach has been to pain or coat a solution containing cholesteric material onto the area of interest. This method has not been widely accepted, though, for several different reasons. For one, it is difficult to assure that the coating is applied uniformly over the surface. This results in undependable readings because the variations of color exhibited by such a film of cholesteric material is dependent on the thickness of the coating at the point of light impingement. Moreover, the necessity of spraying the material onto the subject and then later washing it off reduces its attractiveness as a diagnostic tool.

For the above reasons, among others, those in the art investigating the use of cholesteric materials for this purpose, as well as for other purposes, have generally eliminated from consideration the application of a cholesteric material by direct spraying or coating. They have turned, instead, to the use of semi-permanent laminates in which a uniform, hydrophillic and van der Waals' force bound layer of cholesteric material is positioned between a pair of backing and supporting layers, such as layers of polyethelene terephthalate, commonly sold under the trademark "Mylar." Most often, a separate layer of light absorbing (black) material is also included as part of this sandwich, or one of the supporting layers is made light absorbing, to provide a suitable background for viewing and distinguishing color variations in the layer of cholesteric material.

It will be apparent that the temperature sensitivity of a laminate containing a cholesteric material is strongly dependent upon the heat capacity of the other layers in the laminate. In this connection, the high degrees of temperature sensitivity and response rate required to indicate certain deleterious conditions of a human body are not obtainable as a practical matter with presently available laminates.

Another problem with the present laminates is that they generally do not have the flexibility or pliableness necessary to conform closely to dermatoglyphs and differently curved body surfaces. This has limited the diagnostic application of such laminates since for many uses the laminate must be in intimate contact with a surface over the full area thereof before it can display temperature differentials with the necessary accuracy.

Presently available laminates also have a limited shelf life. A primary reason for this is that the binders which are conventionally used with cholesteric materials in laminates are hydrophillic. The results is that moisture tends to be taken up into the laminates by hydroscopic action. Since water adversely affects the anisotropic properties of cholesteric materials, such moisture uptake will destroy the effectiveness of the laminates in a relatively short time.

Although those in the art recognize the limitations caused by the generally non-flexible character of presently available cholesteric laminates, no satisfactory flexible laminate or sheet of thermally responsive material has been made available to now. The problem with developing such a material is that cholesteric materials are not only temperature sensitive, but are also pressure sensitive, as mentioned before. The result is that when a cholesteric laminate is bent or flexed, the effect of internal stresses within the laminate on the cholesteric material causes color variations which are not the result of the temperature of the material, thus rendering the laminate useless for many applications requiring sensitivity.

SUMMARY OF THE INVENTION

The present invention provides an elastic and highly flexible membrane incorporating a material having anisotropic optical properties, e.g., a cholesteric liquid crystalline material, in such a manner that the temperature response of the anisotropic material within the membrane will not be affected by flexing or the application of pressure. To this end, the membrane is formed from a material having the desired elasticity within which the anisotropic material is provided in particulate form. As a particularly salient feature of the instant invention, particles of another material which is incompressible relative to the cholesteric particles are also incorporated into the elastic membrane in intimate mixture with the cholesteric particles. Such particles of an incompressible material are generally larger in size than the cholesteric particles. It has been found that the inclusion in the elastic membrane of such larger incompressible particles along with the cholesteric particles substantially eliminates the adverse effects on the color accuracy and temperature sensitivity of the cholesteric material caused by internal compressive stress in the membrane upon it being flexed or stretched.

Because of high degree of elasticity obtainable with natural or neoprene rubber latex, it is preferable that latex be used as the material within which the particles are embedded in those instances in which the membrane is for the purpose of measuring the temperature profile of an area of skin surface. Such a membrane can be made to conform quite closely to an area of human skin, including within its dermatoglyphs — the normal markings and creases of the skin. Also, a membrane of such material when made quite thin, is gas permeable and will not act as a thermal barrier or inhibit normal skin breathing, with the consequence that the presence of the membrane on the skin does not noticeably change the normal temperature profile thereof.

Another major advantage of utilizing a rubber latex as the material within which the cholesteric particles are embedded is that latex is hydrophobic. Because of such, the membrane will act to protect the cholesteric particles from attack by water. This results in the useful shelf life of a membrane made in accordance with the present invention being greatly extended.

Cholesteric material is commercially formed into particles by encapsulating the liquid material within a suitable medium. When the cholesteric particles making up a part of the instant invention are such conventional encapsulated particles, it is desirable that any hydrophillic binder on the like associated therewith be eliminated. A suitable light absorptive backing layer preferably is also included as a part of the membrane so as to provide a suitable background for separating the light scattered by the cholesteric particles from transmitted and internally reflected light. The flexibility and elasticity of such backing layer is chosen so that the characteristics desired of the laminate are obtained. Moreover, the backing layer is most desirably heat conductive and has a low heat capacity so that its presence does not adversely affect the sensitivity of the cholesteric particles to temperature differentials being measured. When the backing layer is of a latex, it is simply made both heat conductive and light absorptive by uniformly dispersing therein, carbon black which is heat conductive. Carbon black of this type will thus serve a dual purpose in the invention.

Although as discussed above, conventional encapsulated cholesteric particles are satisfactorily usable in the invention, improved encapsulated particles are included as a part of the invention which, among other advantages, eliminates the need for a light absorptive backing layer and are less expensive than presently available encapsulated particles. To these ends, each particle includes a central hard body which is light absorptive at its surface and over which a layer of the desired cholesteric material is provided. A protective layer of a light transparent material surrounds the coated body to isolate the cholesteric material from its external environment and retain the same around the central body as part of the particle. Because the central body of each particle is light absorptive, it provides, in effect, the same function for each of the encapsulated particles as the separate backing layer did in the past, thereby eliminating its need. The removal of the backing layer allows more direct conduction of heat from the surface being investigated to the cholesteric material for better sensitivity and accuracy.

Most desirably, each of the encapsulated particles has a generally spherical shape. This results in the cholesteric material presenting a curvilinear surface for the scattering of light, rather than the generally planer surfaces typical of the prior art. Such a curvilinear surface provides a random scattering, resulting in the final membrane not having the directional limitations that are common with prior art arrangements.

The invention has many features and advantages which will be discussed or will become apparent from the following more detailed description of preferred embodiments thereof.

BRIEF DESCRIPTION OF THE DRAWINGS

With reference to the accompanying sheet of drawing:

FIG. 1 is an exploded, isometric view of a preferred thermally responsive device incorporating the invention;

FIG. 2 is an enlarged cross-sectional view of a portion of a preferred embodiment of a sheet of material for indicating temperature differentials;

FIG. 3 is a enlarged and partial sectional view illustrating the preferred embodiment of FIG. 2 in intimate contact with a surface whose temperature profile is desired, and a preferred illuminating and viewing arrangement therefor;

FIG. 4 is a plan view of an alternate embodiment of a thermally responsive device of the invention;

FIG. 5 is an enlarged cross-sectional view of a preferred encapsulated cholesteric material particle of the invention; and FIG. 6. is an enlarged cross-sectional view of a portion of a membrane of the invention incorporating the encapsulated particles of FIG. 5.

DETAILED DESCRIPTION OF THE PREFERRED EMBODIMENTS

With reference to the accompanying drawing, FIG. 1. illustrates a thermally responsive device, generally referred to by the reference numeral 11, which utilizes the material of the invention and is especially adapted for measuring skin temperatures and showing skin temperature patterns and profiles. In this connection, it should be noted that because of its sensitivity and the independence of its response to pressure, the material of the invention is particularly useful in obtaining a precise profile of skin temperature over an area of a human body. As is known, such a temperature profile is useful, for example, in pinpointing vascular stoppages, locating tumors, and indicating the degree to which tissue has been damaged by burning.

The device 11 includes a peripheral support frame 12 which defines a generally closed or circumscribed area covered by a sheet or membrane 13 of the invention. The frame 12 is desirably of a light and somewhat flexible material, such as of the expanded resinous material sold under the trademark Stryofoam, and is slightly elliptical in shape. In this connection, the particular thermally responsive device of FIG. 1. is particularly designed for measuring the temperature profile of a woman's breast.

The sheet 13 of the material of the invention is secured adjacent its perimeter to the frame 12 so as to be maintained generally in a plane by the frame. As is illustrated, though, the sheet 13 is not stretched tightly over the frame but is somewhat loose so as to permit the same to take on the generally convex curvature characteristic of a breast.

FIG. 2. represents an enlarged partial cross-section of the material 13. As is illustrated therein, such material is a laminate having three distinct layers, a backing layer 14, a temperature responsive layer 16 having cholesteric material incorporated therein, and a protective upper layer 17. As previously mentioned, prior permanent sheet materials of this type, as opposed to removable coatings, have generally been relatively inflexible and incapable of conforming to the various dermatoglyphs of human skin. One of the primary reasons for this is that, in general, those materials having the flexibility and elasticity necessary to enable the same to conform to the contours of a human body part are also materials which will develop internal stresses and the like, and apply pressure to the cholesteric material, thereby affecting its temperature response. Permanent arrangements have therefore generally been limited to sandwichs in which the cholesteric material is layered between two somewhat rigid support layers, such as layers of polyethylene terephthalate. Not only is such a sandwich incapable of closely conforming to the contour of human skin, but also whatever flexing of such a sandwich that can be done will result in major color changes in the cholesteric material independently of any thermal change thereof.

As a particularly salient feature of this invention, the construction of the sheet of material 13 is such that it has the necessary elasticity and flexibility for intimate contact with the skin contour of a human body whose temperature is to be mapped, and yet neither flexing nor slight stretching thereof results in pressure interference with the color response thereof due to temperature changes. More particularly, the primary layer of the sheet of material, layer 16, is made up of a flexible and elastic material 18, such as natural or synthetic rubber latex, having embedded therein encapsulated particles 19 of cholesteric material. The latex 18 within which the encapsulated particles 19 are embedded is most desirably transparent so that it will not interfere with the transmission of light to and from such encapsulated particles.

The use of latex as the matrix material within which the encapsulated particles 19 are embedded has another major advantage. That is, the hydrophobic nature of the latex will protect the cholesteric material of the particles 19 from deterioration due to moisture.

As previously mentioned, encapsulated cholesteric material suitable for use with the instant invention is commercially available. For example, the National Cash Register Company makes available cholesteric material encapsulated by pig gelatin or polyvinyl alcohol into particulate form in the 10–30 micron diameter size. It will be appreciated that the cholesteric compound or mixture of compounds chosen to provide the anisotropic optical properties will depend, of course, on the desired sensitivity and temperature range within which a response is required. In order to provide temperature profiles of different areas of various human bodies, the temperature range of 30° C to 40° C should be covered, and a marked change in color, such as from green to yellow, should be observable with about a 1.2° C temperature differential. The encapsulated cholesteric materials sold by National Cash Register Company under designations R–30; R–33; R–35 and R–37 collectively cover this temperature range and provide the desired temperature differential sensitivity. Most desirably, cholesteric particles having these separate designations are provided in separate membranes which are usable to collectively cover the range with the desired sensitivity.

As is known, stretching or flexing of an elastic material, such as latex, will normally cause internal stresses in such material. Such stresses will, in turn, tend to apply pressure to the cholesteric particles. Moreover, during the formation of films of an elastic material such as latex by setting or curing a liquid having the elastic material, dimensional changes in the films will result in uncontrollable internal pressure changes that will tend to affect the cholesteric particles differently from film to film. As a particularly salient feature of the instant invention, the thermally responsive membrane is constructed to have the flexibility and elasticity obtainable with a latex material while at the same time assuring that the encapsulated cholesteric particles are protected not only from internal stresses and pressure changes within the latex, but also from externally applied compressive forces. More particularly, it has been found that if particles 21 of a material which is incompressible relative to, and of a size larger than, the cholesteric particles 19, are intimately mixed with the cholesteric particles in the elastic material, flexing and stretching of the resulting membrane will not appreciably affect the thermal responsiveness and sensitivity of the encapsulated particles. This is particularly true when the thickness of the flexible material is of the same order as the diameter of the larger particles as illustrated in FIG. 3. In such a dimensional relationship, the particles are generally in a single layer within the flexible material and extend substantially from one side thereof to the other. Although the reasons why the inclusion in the membrane of the larger, incompressible particles prevents the properties inherent in an elastic membrane from adversely affecting the cholesteric material are not understood with certainty, it is believed that the advantageous results are at least partly due to the incompressible particles supporting the latex around the cholesteric particles and themselves absorbing the internal stresses and compressive forces.

While the layer particles may be of any material which is compatible with both the elastic material and the encapsulated particles, and yet is incompressible with respect to the latter, it has been found that a cross-linked polymeric material is desirable for this purpose. Specifically, divinyl-benzene-styrene cross-linked particles have the desired incompressibility and are compatible with the other components.

It has been found that the numerical proportion of incompressible particles to cholesteric particles can be varied over a wide range without losing the advantageous results of including the same as a part of the membrane. For example, it has been found that the inclusion of one incompressible particle for every ten cholesteric particles in an intimate mixture of particles provides sufficient protection for the cholesteric material to assure that the resulting membrane has the sensitivity to temperature and insensitivity to pressure required for many applications. The numerical proportion of incompressible particles to cholesteric particles is increasable up to about 300 to 1 before the temperature response of the membrane becomes so weak as to render it unusable for most applications. In this regard, as the proportion of incompressible particles to cholesteric particles increases, the brightness of the color response decreases. For best results with a membrane designed for use in providing a body temperature profile, the numerical proportion of the incompressible particles to cholesteric particles should be maintained within a range between 1 and 5 incompressible particles for every 10 cholesteric particles.

As mentioned previously, the size of the incompressible particles 21 is dependent upon the size of the encapsulated cholesteric particles 19. Most desirably, the latter particles are sized to enhance their effectiveness in absorbing heat radiation. In this connection, a predominant portion of heat radiation lies in the infrared spectrum. It has been found that by sizing the particles to have average diameters within the range between 2 and 30 microns, each of the particles acts, in effect, as a tuned antenna with respect to infrared radiation and more efficiently absorbs heat. The result is that a thermally responsive device having a thin sheet of material in which the cholesteric particles are in this size range generally has greater sensitivity than one with randomly sized particles or particles in other size ranges.

With the cholesteric particles in the 2 to 30 micron size range, the incompressible particles are desirably in the size range 50 to 60 microns average diameter. Incompressible particles within such a size range provide the desired protection of the cholesteric particles and also have a diameter in the order of the thickness of the latex layer within which they are embedded. Such particles therefore also protect the cholesteric particles from surface affects, such as compressive pressure applied to the material.

The backing layer 14 is of a light absorptive material in order to reduce internal reflection of light within the membrane, which light will interfere with the light scattering provided by the cholesteric particles 19. Most desirably, the backing layer is of a polymeric material, such as natural rubber latex, having generally the same flexibility and elasticity as that used for the thermally responsive layer 16. This will assure that presence of the backing layer as part of the sheet will not adversely affect the desired flexibility and elasticity of the final material. While the light absorptive characteristic of the backing layer may be provided in several different ways, preferably it is obtained by having heat conductive carbon black uniformly dispersed therein. Such carbon black will not only provide the light absorption but also aid in the transmission of temperature differentials through the backing layer to the cholesteric particles. This is particularly important when the material is used in mapping the temperature contour of an area of human skin. Such provision of the heat conductive carbon black will prevent the sheet of material from acting as a barrier to heat transmission from the body. As is known, such a barrier will change the temperature of the body and result in the thermal response of the material not being indicative of the thermal condition of the body in its normal state.

The protective film or layer 17 is of a light transparent material so that illumination is allowed to penetrate into the material and be scattered by the cholesteric particles 19. The exterior surface of the film 17 is desirably made non-reflective such as by being provided with closely spaced corrugations 22. A suitable material for such purposes is a polyolefin, such as polyethylene, having generally the same flexibility and elasticity as the material 18. Such a film is hydrophobic and will aid in protecting the cholesteric particles from deterioration due to moisture. Other polymeric sheets such as of polyvinyl or polycarbonate which are also hydrophobic are usable for this purpose.

Although several different methods by which the sheet of the invention can be manufactured will be readily apparent to those skilled in the art, one suitable method will be presented herein as illustrative. In this method, the upper protective layer 17 is chosen as a base to which the other layers are applied. A thin (5 mils or less) transparent polymer sheet, such as that sold under the trademark "Handi-wrap," is first laid out in a flat, planer condition. The latex for the film 16 is provided in an aqueous emulsion to which the cholesteric and incompressible particles are added. Such emulsion contains 2 to 4 percent by weight of latex, preferably natural rubber latex, and about 0.5 percent of a surfactant which will provide good wetting properties to the emulsion. A suitable surfactant for this purpose is that sold by the Union Carbide Company under the trade name "Tergitol Anionic 7."

The quantity of particles added to the emulsion is about 10 percent by weight of the desired cholesteric particles and about 3 percent by weight of the incompressible particles. The resulting mixture is blended and then sprayed onto the polymer sheet. The thickness of the sprayed coating should be no greater than is necessary to provide a continuous coating. In this connection, it is most desirable that the coating have no greater thickness than about 100 microns in liquid form when the particles are sized within the preferred ranges set forth earlier. The result is that the particles within the final latex film will generally be in a monolayer.

The latex coating is then dried by any suitable means, such as by passing warm air thereover. In this connection, the temperature of the coating should not be allowed to reach a temperature at which the cholesteric material will become a liquid and lose its anisotropic optical properties. For example, if the cholesteric material is one which is mesomorphic somewhere in the range between about 30° C and 40° C as discussed above, the temperature of the film should not be allowed to exceed 40° C. Evaporation of the water from the coating will result in the desired film being produced, of mixed particles within a latex binder.

After the latex 18 is fully dried, the film 14 is formed thereon. To this end, about 7 percent by weight of finely divided heat conductive carbon black is added to an aqueous emulsion of natural rubber latex. The emulsion includes about 0.5 percent by weight of a surfactant, and about 40 percent by weight of latex. The resulting arrangement is sprayed onto the film 18 to provide a uniform coating thereon. Most desirably, the coating is made as thin as practical (0.5 mil to 1 mil) while fully covering the film 18 so that the resulting backing layer will be of minimum thickness. The emulsifier is then dried from the coating to form the backing layer and thereby provide the finished thermally responsive membrane.

FIG. 3 illustrates a preferred arrangement for utilizing the desirable characteristics of the membrane of the invention in obtaining a temperature profile of an area of skin surface on a human body. As is illustrated, the sheet 13 is provided in intimate contact with the surface of the body, represented at 23. Because of the elastic nature of the sheet 13, it conforms to the contour of the body and provides uniform contact therewith so that dermatoglyphs and the like do not materially affect the reliability of its response.

It should be noted that because of the high thermal response of the membrane of the invention, it is useable as a diagnostic tool in ways not heretofore available. In this connection, one must remember that the human body emits and absorbs heat primarily through radiation. It has been found that the rate at which such radiation is either emitted or absorbed is related to certain pathologic conditions it may be desired to detect. The fast response rate of the membrane makes it useable to measure such emission or absorption rates. For example, the area of interest in the human body can be cooled or heated to a predetermined temperature, and then the membrane used to measure the rate at which the body returns to a normal temperature, merely by observing the rate at which color changes are produced in the membrane by the body temperature change. Because of its fast response rate, the membrane of the invention is also useable to detect shifts in the temperature pattern of a body. That is, the line of demarcation between two colors produced by the membrane will represent the interface between two different temperatures on the area being diagnosed. If the temperature differential interface on the body should move, the line of demarcation between the two colors emitted by the membranes will instantaneously follow such movement, and thereby provide an observable indication thereof which is, for all practical matters, coincident in time with the temperature shift.

The sensitivity with which color variations in the sheet 13 are discernible by a viewer will depend, among other things, on the nature of the light impinging thereon and the proportionate amount of such light which is reflected from the material without being scattered by the cholesteric particles. The arrangement of FIG. 3 includes an illuminating and viewing combination which substantially enhances the ability of a viewer to discern color variations caused in the sheet by temperature differentials. To this end, an electrical light filament 24, desirably of tungsten for greater efficiency and intensity, is provided as a light source. Means are interposed between the filament 24 and the sheet for appropriately conditioning the light prior to its impingement on such sheet. More particularly, a film 26 of 90° polarizing material, such as a polarizing film sold under the trademark "Polariod" is positioned in front of the filament 24. The film 26 includes means for distributing the light 24 uniformly over an area prior to it passing through the polarizing portion thereof. That is, a monolayer 26 of closely spaced, translucent beads 27 is provided on the light entrance face of the film 26. The beads can be adhered to the film 26 by any appropriate transparent adhesive. Each of the beads 27 is most simply a bead of the same type of material as that of the incompressible particles in the membrane 13. That is, such beads are desirably of a polymeric material, preferably cross-linked divinyl-benzene-styrene copolymer.

Although beads 27 of various sizes provide the desired diffusion of light emanating from the filament 24, it is most desirable that such beads have diameters within the range of about 2-20 microns. It has been found that when the beads are of such a size, the diffusing layer 27 acts not only to provide the desired light diffusion, but also acts as a heat shield to prevent infrared radiation from the lamp 24 from reaching and affecting the response of the sheet 13 to the temperature of body 23. Since the wave length of infrared radiation, i.e., that electromagnetic radiation commonly referred to as heat, is also in the 2-20 micron range, it is believed the reason the layer of particles acts as a heat shield as well as a diffuser is that each of such particles is, in effect, an electromagnetic antenna tuned to intercept and absorb the infrared radiation. Whatever the scientific explanation for this phenomenon, the result is that when the light diffuser is made up of beads 27 within this size range, the necessity for a separate heat shield to protect the thermally responsive sheet 13 from the heat generated by the light source is obviated.

As mentioned previously, the polarizing film 26 polarizes the light emanating from the filament 24 prior to its impinging on the sheet 13. This polarization of the impinging light, in combination with an appropriate analyzing arrangement, separates light scattered by the cholesteric material from all other light radiating from the material 13. In this connection, it is to be noted that substantially all cholesteric materials not only scatter polarized light, but also angularly rotate such light through a particular angle, e.g., 20°. The result is that the light which is scattered from the particles, i.e., that light exhibiting the color characteristics of the temperature of such cholesteric material, is distinct from other light emanating from the sheet. This phenomenon is taken advantage of in the instant invention to minimize the adverse affects of such other light on viewing the scattered light. To this end, a polarizing analyzer 28, also desirably a polarizing film of the type sold under the trademark "Polariod," is positioned between an observer, represented at 29, and the light from sheet 13. With appropriate positioning and orientation of the analyzer 28, only that polarized light which is both scattered and angularly rotated by the cholesteric material is allowed to reach the observer 29. The proper position and orientation for the analyzer can be found by the observer merely rotating and moving the analyzer until he sees color variations when looking through the analyzer at the sheet 13. Because of the combined effects of the polarization and angular rotation, all other light, including that which is polarized by the polarizer 26 but which is not scattered but merely reflected in its polarized state, will be prevented by the analyzer from being transmitted to the viewer. When light scattered from a known cholesteric material is to be viewed, the relative positions of the light source and the analyzer can be predetermined to eliminate the necessity of the viewer having to move the analyzer with respect to the sheet and light source each time the known sheet 13 is to be used. For example, with many preferred cholesteric materials in which the scattered light is rotated 20°, the light source can be mounted on a head band to be worn by the observer desirous of utilizing the sheet, and the analyzer can be provided as a pair of glasses to be worn by such observer. With such an arrangement, an observer can obtain the desired distinct color observation by merely adjusting the position of his head slightly with respect to the sheet 13.

In some diagnostic uses for which the present invention is suitable, it is desirable that several temperature profiles at various time intervals be made of the area of the human body of interest to determine whether or not temperature changes are occurring over a period of time. The invention includes means facilitating such a periodic temperature mapping. With reference to FIG. 1, again, a separate sheet of transparent material 31 is provided which is fittable inside the frame 12 to register with the membrane 13. Such sheet would have the same elasticity and flexibility as the membrane 13 so as to be conformable therewith and, in this regard, is desirably a thin (5 mils or less) sheet of clear latex. An array of indicia in the form of equally spaced apart vertical and horizontal scoring lines 32 demarcate the surface of sheet 31.

In use, the sheet 31 is fittable within the frame 12 when the thermally responsive device is brought into intimate contact with a portion of a body to be investigated. The investigator can then mark various points of differential temperature on the sheet 31. One or two of such points can be used as index points to assure that the device is repositioned over the same area and in the proper orientation at a later time. Spots of interest showing a temperature differential are marked or outlined directly on the face of the sheet 31. The sheet 31 is then usable at a later time to determine whether or not the spots of temperature differential are still in existence, have moved, or have changed size.

The advantage of providing a separate sheet 31 having the array of indicia is that a plurality of different sheets are usable to provide a permanent temperature differential record for different patients, while at the same time enabling one thermally responsive device of the invention to be used to provide all of such records. Because the thermally responsive devices of the present invention are relatively inexpensive, however, in some instances it is almost as economical to provide the array of indicia directly on the thermally responsive membrane 13. FIG. 4 illustrates a thermally responsive device 11' of the instant invention on which the array of indicia in the form of horizontal and vertical scored lines 32' are applied directly to the thermally responsive membrane 13'.

Although the cholesteric material can be provided as discussed above in the form of encapsulated particles of a type now available, as a particularly salient feature of the instant invention, it includes an improved encapsulated particle which eliminates the necessity for a light absorptive background as part of the thermally responsive sheet. FIG. 5 is an enlarged cross-sectional view of such an improved encapsulated particle. More particularly, such particle, generally referred to by the reference numeral 36, includes a central body 37 having a light absorptive external surface 38. A layer of liquid crystalline material 39 surrounds the light absorptive surface of the body and is maintained thereon by an outer protective layer or casing 41.

It will be readily recognized that substantially all light intercepted by the improved encapsulated particle 36 and not scattered by the layer 39 of cholesteric material will impinge upon the central body 38. Since such body is light absorptive, the light transmitted thereto will, in general, be absorbed rather than reflected. Thus, the particle 36 not only provides the desired light scattering but also provides an appropriate background for observing the scattered light without interference by reflected light. Moreover, the provision of the central body 37 within the interior of the particle reduces the amount of cholesteric material required to provide particles of the desired size. Because of the relatively high expense of cholesteric materials, this is not an insubstantial advantage.

The material chosen for the central body 37 need not have any special characteristics, other than the ability to generally retain its shape and not adversely contaminate the layer 39 of cholesteric material. Desirably, however, the body 37 is of a polymeric material having a density generally the same as that of the cholesteric material so that gravity will not tend to appreciably affect its central positioning within such material. More specifically, the material 37 is preferably of a copolymer, such as the same divinyl-benzene-styrene crosslinked copolymer used for the incompressible particles 21. As is known, the size of such particles can be closely controlled during copolymerization, such as when copolymerized by the method described in U.S. Pat. No. 2,366,007. Such a particle can be provided with a light absorptive surface 38 in numerous different ways. For example, a light absorptive material, such as carbon black, can be incorporated into the particle at the time it is formed, or the surface of the particle can be oxidized or otherwise made light absorptive.

Although any of the cholesteric materials are suitable for providing the layer 39, as mentioned before, the density of the cholesteric material and central body 38 should be generally the same. In this connection, the stearate ester cholesteric materials generally have a specific gravity of the same order as the divinyl benezene-styrene cross-linked copolymer, i.e., in the range of about 1.2 through 2.

The protective layer or casing 41 should be transparent to light so that the desired light scattering by the cholesteric material is obtainable. The nature of the material for the layer 41 is in other respects primarily dependent upon the environment in which the particle is to be employed and the suitability of the material for forming the desired protective layer. In the instant situation in which the particle is to be incorporated within a latex, it has been found that a thermoplastic material, such as polyvinyl alcohol, is a suitable material for the casing 41. Other acqueous-based binders, such as proteins, are also suitable.

Several different methods for manufacturing the encapsulated particles 36 will be apparent to those skilled in the art. The method chosen will depend, of course, on the particular materials used for the various parts of the particles. In general, however, one starts with the particles forming the central body. If, as in the present situation, it is desirable that the final encapsulated particles be of a particular size, the size range for these central bodies 37 is chosen accordingly. As mentioned previously, it is most desirable that the cholesteric particles be in the size range of 2–20 microns in diameter so as to act as antennas tuned to infrared radiation. The particles 37 are thus chosen by sieving or the like to also be within this range, since the addition of the cholesteric material and the outer layer add no appreciable thickness to the particle. It should be noted that the sizing of the central bodies at the beginning of the manufacturing process to provide the desired size of the finished encapsulated material, minimizes wastage of cholesteric material.

The layer 39 of cholesteric material is suitably coated onto the particle 37. To this end, the cholesteric material is first made liquid by introducing the same into a suitable solvent or by raising it above its melting point. In either case, the resulting system is introduced with the particles 37 into a stirred water or other liquid bath with which neither the particles 37 nor the cholesteric material is miscible.

If the cholesteric material is provided in a solution, the solution and the particles 37 are introduced into the liquid bath at a temperature lower than the boiling point of the solvent. As the bath is stirred, the temperature of the same is then raised above the boiling point of the solvent so as to drive the same from the system and allow the cholesteric material to precipitate out. The stirring action during this time will result in the cholesteric material coating the particles 37 and forming the layer 39 as it precipitates from the bath.

If the cholesteric material is added to the bath as a liquid in-of-itself, i.e., melted rather than in solution, the bath is provided at a temperature above the melting point of the cholesteric material at the time such material is added thereto. The particles 37 are also introduced into the bath at such time, and the bath is then slowly cooled and stirred to solidify the cholesteric material around the particles 37 and thus provide the desired layer 39.

The protective shell or casing 41 can also be provided via an aqueous bath. More particularly, a material such as polyvinyl alcohol or a protein can be added to the stirred water bath after the coating of the desired cholesteric material is formed around the particles 37. The protective layer material can be made to precipitate from the acqueous bath in numerous ways, depending upon the nature of the protective material. For example, the temperature or pH of the bath can be changed to provide the precipitation as commonly done.

FIG. 6 illustrates a membrane of the invention incorporating the improved encapsulated particles of the invention. This embodiment of the invention is similar to that previously described in that the particles 36 are incorporated into a suitable medium providing a flexible membrane 16, such as latex, along with the larger, incompressible particles 21 discussed previously. However, in this embodiment it is not necessary to include the light absorptive background since each of the particles 36 provides its own background as previously described. Moreover, the protective layers for the membrane are also not necessary since the casing for the particle 36 is non-miscible with water. The result is that the casings for each of the particles, as well as the latex, will protect the cholesteric material from deterioration caused by water. The thermally responsive sheet utilizing the improved encapsulated particles of the invention therefore has only one layer and is thereby even more flexible and presents less of a thermal barrier to a surface being investigated than the embodiment of the invention shown in FIG. 2.

While the invention has been described in connection with several preferred embodiments thereof, it will be appreciated by those skilled in the art that various changes and modifications can be made without departing from its spirit. It is therefore intended that the coverage afforded applicant be limited only by the claims and their equivalents.

We claim:

1. A thin sheet of material for indicating temperature differentials comprising an elastic membrane of material having imbedded as a layer therein an intimate mixture of encapsulated particles of a cholesteric liquid crystalline material exhibiting differential surface reflection of light dependent upon the temperature thereof and to particles of a material which is incompressible relative to said encapsulated particles, said incompressible particles being larger in size than said encapsulated particles to protect the latter from compressive stress within said film; said encapsulated particles of a cholesteric material each including a central body which is light absorptive at its surface, a layer of said cholesteric material overlying the exposed light absorptive surface of said body, and a protective layer of a light transparent material for isolating said cholesteric material from the external environment surrounding said body and said layer of cholesteric material thereon.

2. The thin sheet of material for indicating temperature differentials of claim 1 wherein said encapsulated cholesteric particles are generally in the size range of 2–30 microns in diameter, and said particles of an incompressible material are generally in the size range of 50–60 microns in diameter.

3. The thin sheet of material for indicating temperature differentials of claim 2 wherein said encapsulated cholesteric particles are generally in the size range of 2–20 microns in diameter so as to be tuned by size for the reception of infrared radiation.

4. The thin sheet of material for indicating temperature differentials of claim 3 wherein the material of said membrane is natural rubber latex.

5. The thin sheet of material for indicating temperature differentials of claim 4 wherein said membrane has a thickness of about 5 mils or less.

6. The thin sheet of material for indicating temperature differentials of claim 4 further including a light absorptive backing layer on said membrane to inhibit the effect of transmitted and internally reflected light on the light reflected from the surface of said cholesteric particles.

* * * * *

UNITED STATES PATENT OFFICE
CERTIFICATE OF CORRECTION

Patent No. 3,852,092     Dated December 5, 1974

Inventor(s)    James A. Patterson et al.

It is certified that error appears in the above-identified patent and that said Letters Patent are hereby corrected as shown below:

On the cover sheet insert:

-- [73] Assignee: said Patterson assor. to said Finkle --.

Signed and sealed this 11th day of February 1975.

(SEAL)
Attest:

RUTH C. MASON
Attesting Officer

C. MARSHALL DANN
Commissioner of Patents
and Trademarks